Figure 1:
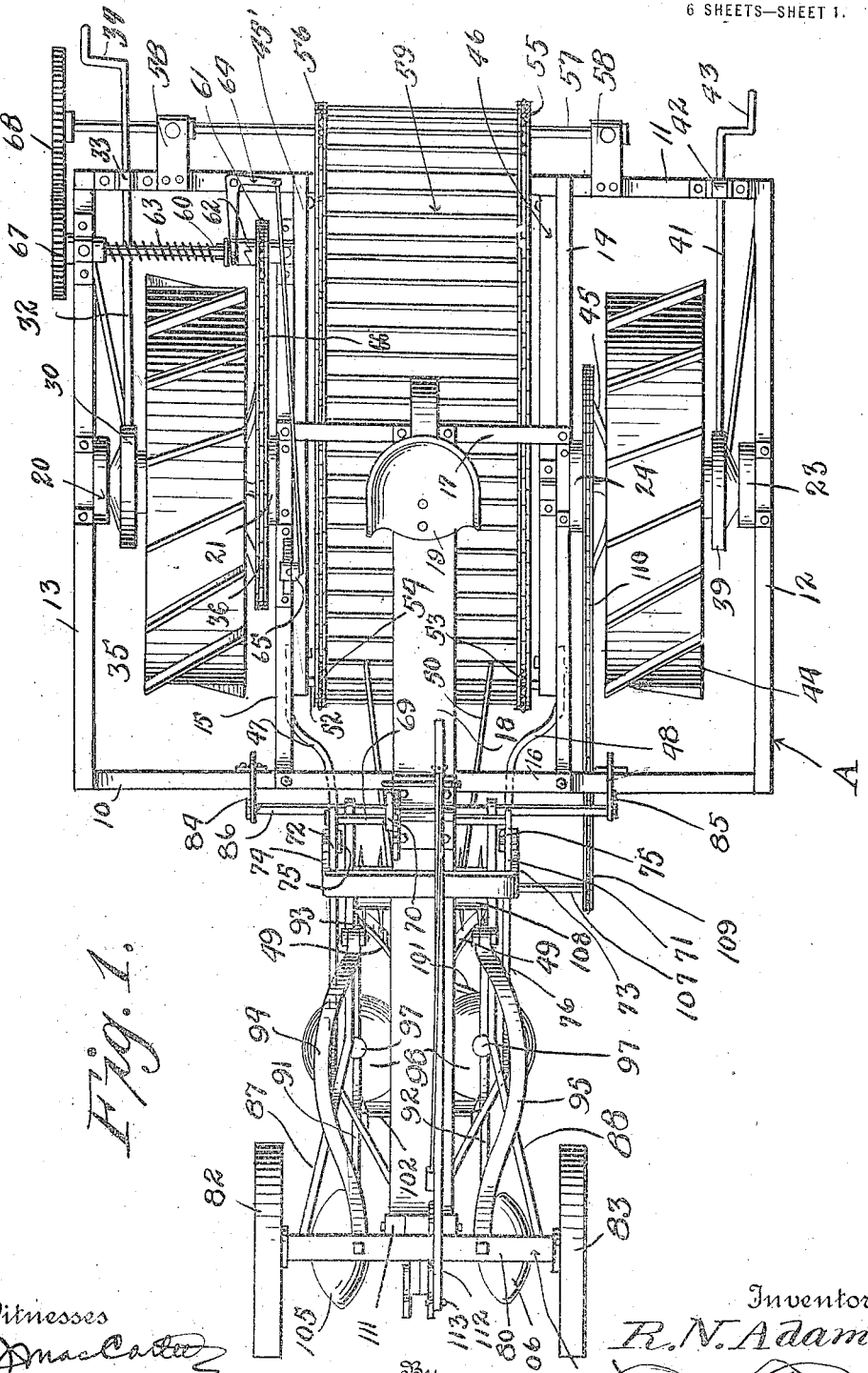

R. N. ADAMS.
BEET HARVESTER.
APPLICATION FILED JULY 11, 1913.

1,145,538.

Patented July 6, 1915.
6 SHEETS—SHEET 1.

Witnesses

Inventor
R. N. Adams
By
Attorneys

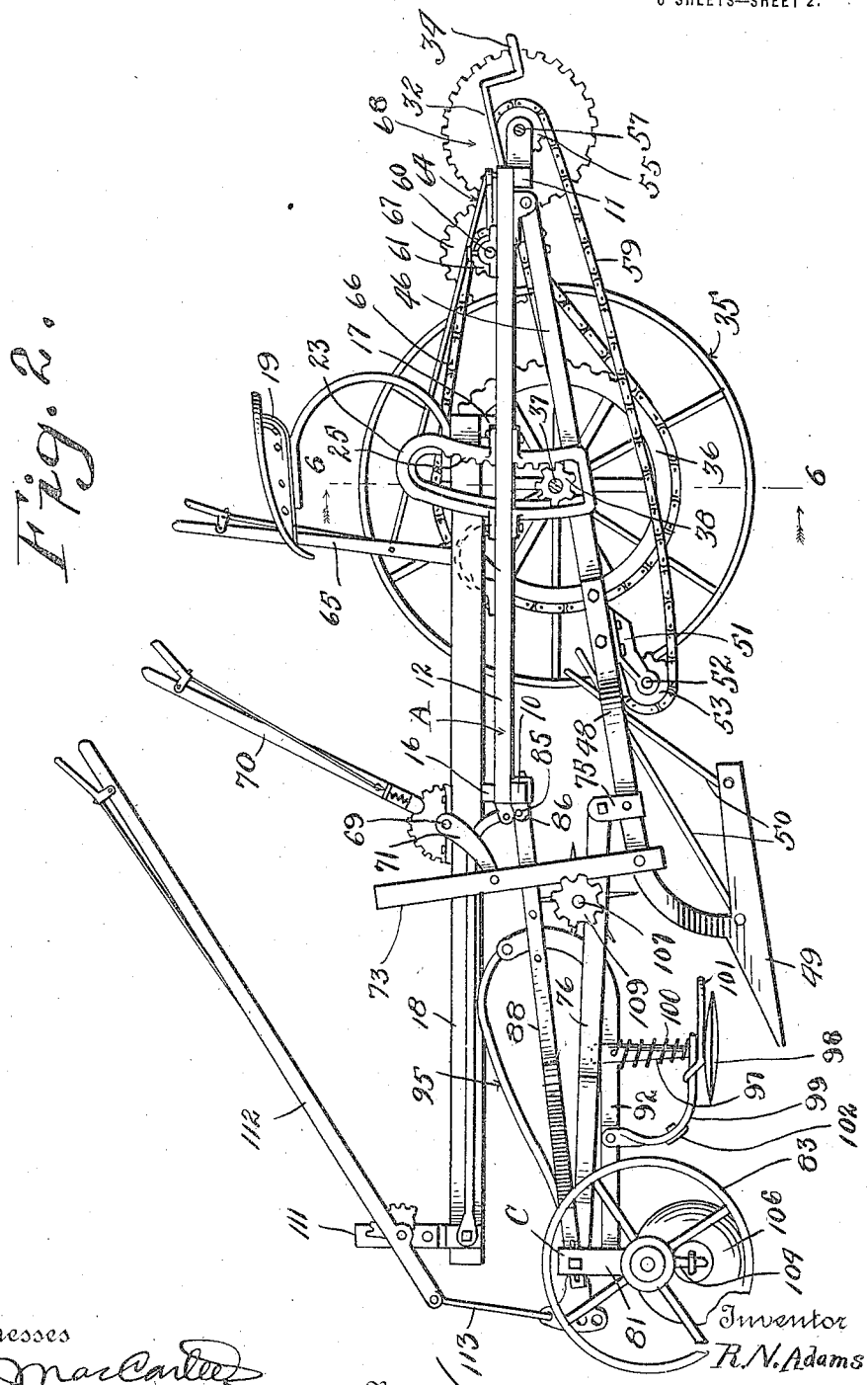

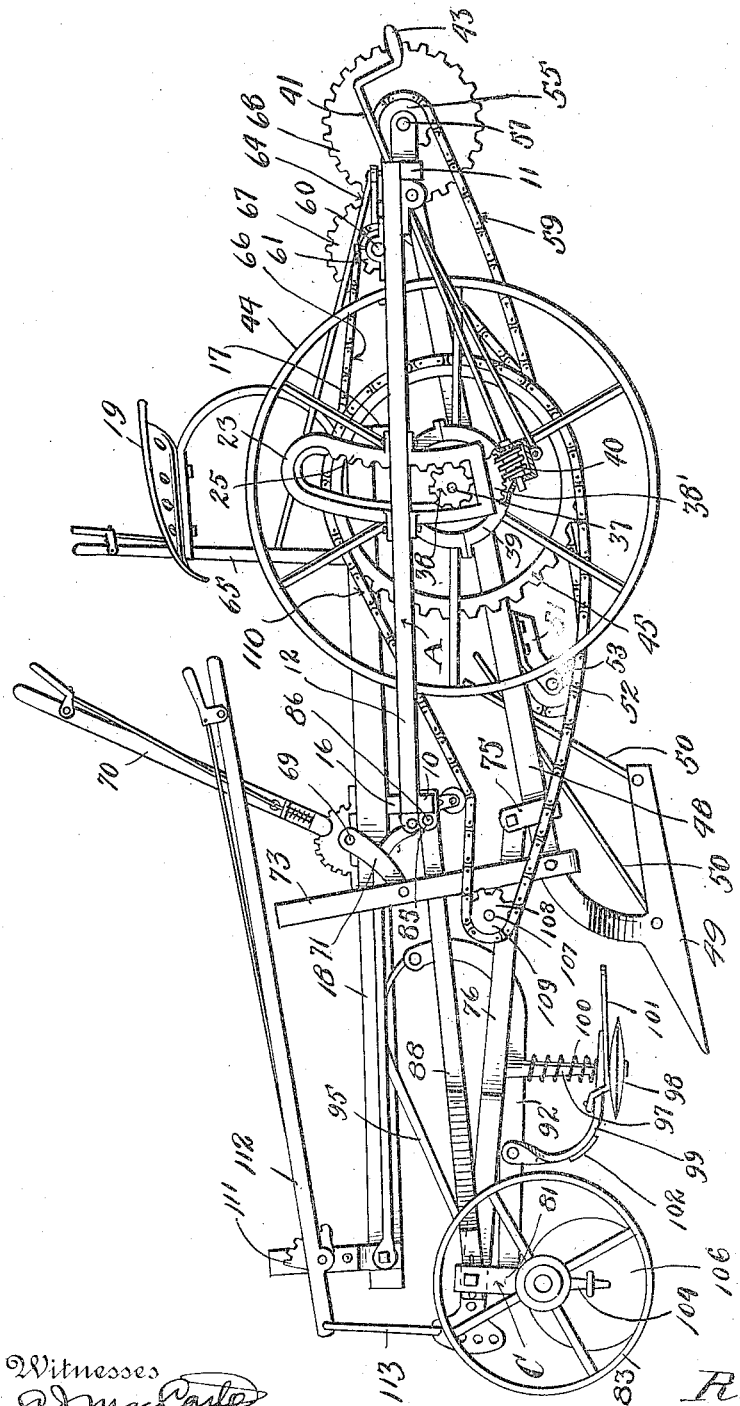

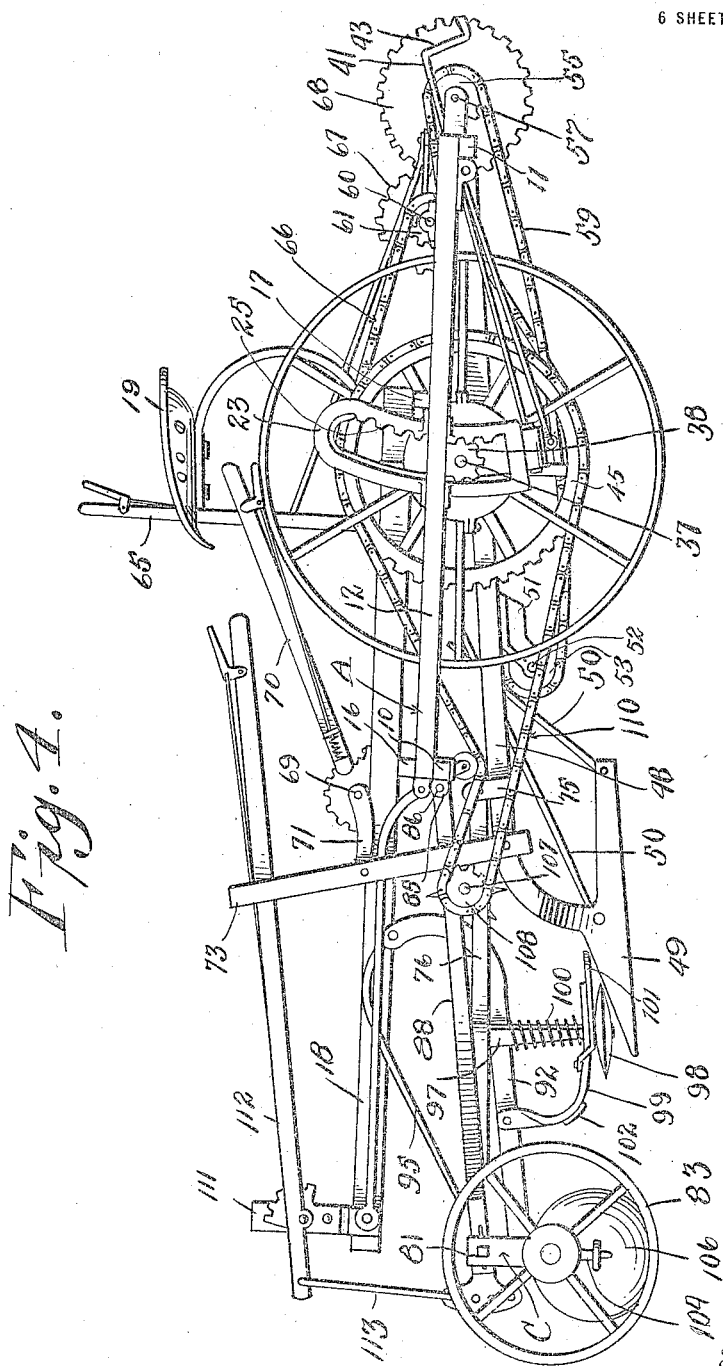

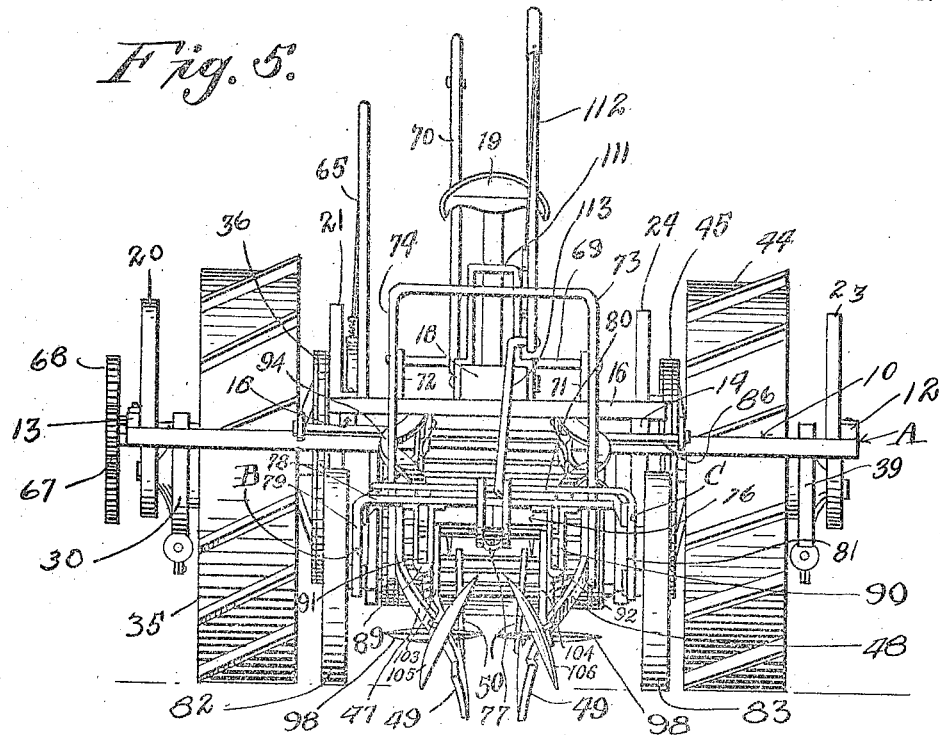

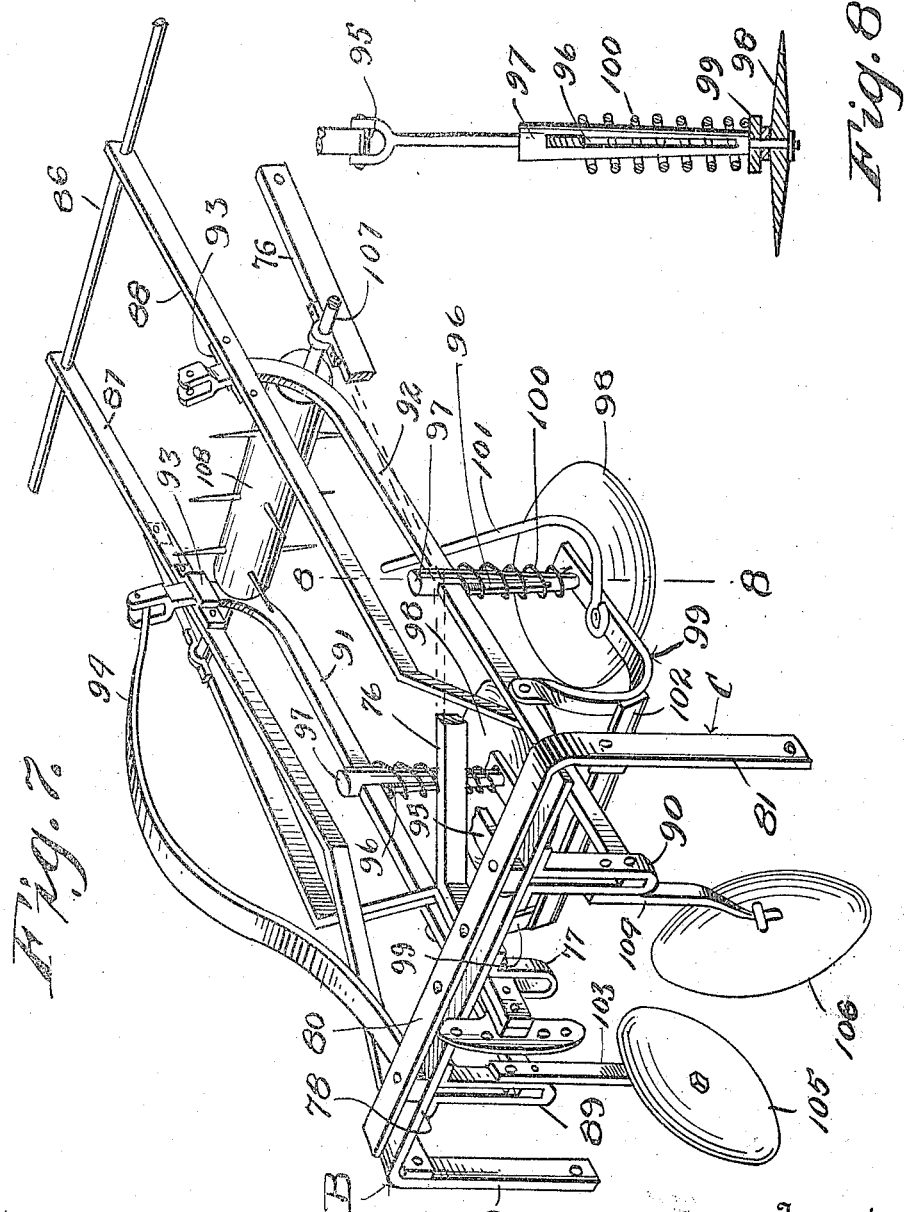

UNITED STATES PATENT OFFICE.

ROBERT N. ADAMS, OF RICHFIELD, UTAH.

BEET-HARVESTER.

1,145,538.  Specification of Letters Patent.  Patented July 6, 1915.

Application filed July 11, 1913. Serial No. 778,603.

*To all whom it may concern:*

Be it known that I, ROBERT N. ADAMS, a citizen of the United States, residing at Richfield, in the county of Sevier, State of Utah, have invented certain new and useful Improvements in Beet-Harvesters; and I do hereby declare the following to be a full, clear, and exact description of the invention, such as will enable others skilled in the art to which it appertains to make and use the same.

This invention relates to beet harvesting machines.

The object of the invention resides in the provision of a beet harvesting machine embodying an improved construction of topping mechanism.

With the above and other objects the invention consists in the detail of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a beet harvesting machine constructed in accordance with the invention; Fig. 2, a side view of the machine with the plow or digger element adjusted to its lowermost position; Fig. 3, a view similar to Fig. 2 showing the relation of the parts when the topping mechanism has been adjusted upwardly to its full extent; Fig. 4, a view similar to Fig. 2 showing all the parts of the machine at the limit of their upward adjustment; Fig. 5, a front view of the machine; Fig. 6, a section on the line 6—6 of Fig. 2; Fig. 7, a detail perspective view of a portion of the forward end of the machine; Fig. 8, a section on the line 8—8 of Fig. 7.

Referring to the drawings the machine is shown as comprising a main frame A which includes front and rear members 10 and 11, side members 12 and 13, and intermediate longitudinal members 14 and 15. Supported upon the intermediate longitudinal members 14 and 15 is a forward cross beam 16 and a rear cross beam 17 and upon these cross beams 16 and 17 is mounted a draft tongue 18 and an operator's seat 19. Mounted on the side member 13 and the intermediate longitudinal member 15 are vertical frames 20 and 21 respectively which are provided with internal teeth 22 on one side. Also mounted on the side member 12 and intermediate longitudinal member 14 are vertical frames 23 and 24 respectively which are also provided with internal teeth 25 on one side. Disposed between the frames 20 and 21 is a shaft 26 which has fixed on its ends pinions 27 and 28, the pinion 27 meshing with the teeth 22 of the frame 20 and the pinion 28 meshing with the teeth 22 of the frame 21. Also fixed upon the shaft 26 just inwardly of the pinion 27 is a worm wheel 29 which is inclosed by a casing 30 loosely mounted upon the shaft 26. Also inclosed by the casing 30 is a worm 31 meshing with the worm wheel 29 and having secured thereto a stem 32 rotatably mounted in a bearing 33 pivoted upon the rear member 11 of the frame A and terminating in a crank handle 34 whereby said stem may be rotated to effect the rotation of the worm 31. By this construction it will be apparent that by rotating the stem 32 the shaft 26 will also be rotated to move said shaft up and down as a result of the engagement of the pinions 27 and 28 with the teeth 22 of the frames 20 and 21 respectively.

Loosely mounted on the shaft 26 is a traction wheel 35 which has secured to the inner side thereof a sprocket wheel 36 for a purpose that will hereinafter appear. Disposed between the frames 23 and 24 is a shaft 37 which has fixed on the ends thereof respectively pinions 38 which mesh with the teeth 25 of the frames 23 and 24 respectively. Fixed on the shaft 37 just inwardly of the frame 23 is a worm wheel 38′ surrounded by a casing 39 loosely mounted on the shaft 37. The casing 39 also incloses a worm 40 which meshes with the worm wheel 38′ and has attached thereto a stem 41 rotatably mounted in a pivoted bearing 42 mounted on the rear member 11 of the frame A. The end of the stem 41 remote from the worm 40 terminates in a crank handle 43 whereby the rotation of said stem may be conveniently effected. By this construction it will be apparent that upon the rotation of the stem 41 the shaft 37 may be raised and lowered. Loosely mounted on the shaft 37 is a traction wheel 44 which has fixed thereto a sprocket wheel 45 for a purpose that will presently appear. Pivoted to the inner side of the intermediate longitudinal member 15 at the rear end of said member is one end of a beam 45′, while a corresponding beam 46 has one end pivoted to the inner side of the intermediate longitudinal member 14 at the inner end of said longitudinal member. Secured to the forward ends of the beams 45' and 46 are plow beams 47 and 48 respectively which carry on their forward ends plows or diggers 49. Secured to these diggers 49 respectively are rearwardly directed rods 50 for a purpose that will hereinafter appear.

Mounted upon the beams 45' and 46 respectively are brackets 51 in which are rotatably mounted the ends of a shaft 52. Fixed upon this shaft 52 are spaced sprocket wheels 53 and 54 which aline with sprocket wheels 55 and 56 respectively fixed upon a shaft 57 rotatably mounted in brackets 58 extending rearwardly from and secured to the rear member 11 of the frame A. Traveling upon the sprocket wheels 53, 54, 55 and 56 is an endless conveyer 59 of a construction suitable for elevating the beets delivered thereto from the diggers 49. Journaled on the intermediate longitudinal member 15 and the side member 13 is a shaft 60 which has loosely mounted thereon a sprocket wheel 61 adapted to be connected to the shaft 60 by a clutch element 62 normally held active by a spring 63 and controlled through suitable connections 64 with a hand lever 65 mounted upon the longitudinal intermediate member 15. Traveling on the sprocket wheels 36 and 61 is a sprocket chain 66 and fixed on the outer end of the shaft 60 is a gear 67 which meshes with a gear 68 fixed on the shaft 57. By this construction it will be apparent that when the machine is moved along the ground and the clutch element 62 thrown in the shaft 57 will be rotated to effect the operation of the conveyor 59.

Journaled upon the tongue 18 just forward of the front member 10 of the frame A is a transverse shaft 69 which has secured thereto one end of a lever 70 whereby said shaft may be rotated. The shaft 69 is provided with crank arms 71 and 72 which are connected at their free ends to the arms 73 and 74 respectively of a U-shaped yoke which embraces the tongue 18. The arms 73 and 74 of this yoke are also connected adjacent their free ends to the beams 48 and 47 of the diggers 49. By this construction it will be apparent that upon rotating the shaft 69 the diggers 49 can be raised and lowered and likewise the receiving end of the endless conveyer 59. Mounted on the beams 47 and 48 respectively are clips 75 upon which is pivotally supported the inner end of a clevis frame 76. The forward end of this clevis frame 76 is movable in a U-shaped bracket 77 depending from the horizontal arm 78 of an angle member B, the vertical arm of said angle member being indicated at 79. Disposed in overlying relation to the horizontal arm 78 is the horizontal arm 80 of an angle member C, which angle member C includes a vertical arm 81. Journaled on the lower end of the vertical arms 79 and 81 are front traction wheels 82 and 83 respectively. Projecting forwardly from the front member 10 of the frame A are spaced brackets 84 and 85 which support a rod 86. Pivotally mounted on this rod 86 are the inner ends of beams 87 and 88, the outer ends of said beams being secured respectively to the inner ends of the vertical arms 79 and 81. Depending from the horizontal arm 78 of the angle member B are brackets 89 and 90 in which are pivotally mounted respectively the forward ends of arms 91 and 92. The inner ends of these arms 91 and 92 are curved upwardly and slidably engaged through guides 93 mounted on the inner sides of the beams 87 and 88 respectively.

Secured to the free ends of the arms 91 and 92 are the corresponding ends of leaf springs 94 and 95 respectively, the other ends of said springs being secured between the horizontal arms 78 and 80 of the angle members B and C. The springs 94 and 95 constantly tend to force the inner or free ends of the arms 91 and 92 downwardly as will be obvious. Each of the arms 91 and 92 passes through a slot 96 in a shank 97 which shank has fixed on its lower end a circular cutting knife 98. Pivoted to the arms 91 and 92 respectively are curved arms 99 through the free ends of which are engaged the lower ends of respective shanks 97. Encircling each shank 97 is a spring 100 and these springs bear at their lower ends against the arms 99 and at their upper ends against the arms 91 and 92 respectively. Mounted on one of the arms 99 is a horizontal rod 101 which extends diagonally across the machine at the rear of the knives 98 so as to throw the beet tops severed by the knives to one side. Connecting the arms 99 is a fender plate 102 which causes the arms 99 to move on their pivots in unison. Depending from the brackets 89 and 90 are arms 103 and 104 respectively which have journaled on their lower ends cultivating disks 105 and 106 for the purpose of throwing the soil away from the rows of beets as the machine moves along the ground.

Journaled on the clevis frame 76 is a transverse shaft 107 which has fixed thereon a toothed roller 108 and a sprocket wheel 109, the latter being connected to the sprocket wheel 45 by a sprocket chain 110. By this construction it will be apparent that as the machine moves along the ground the roller 108 will be rotated to force the beets rearwardly on the rods 50 to effect the proper delivery thereof to the endless conveyer 59. Mounted on the forward end of the tongue 18 is a bracket 111 upon which is pivoted a lever 112. One end of this lever is connected to the clevis frame 76 by a link 113 so that by manipulating the lever 112 the topping mechanism which includes the knives 98 and cultivators 105 and 106 can be raised and lowered to meet the particular conditions at hand.

What I claim is:—

1. In a beet harvesting machine the combination of a wheeled frame, a pair of arms pivoted on said frame, spring means yieldingly supporting the free ends of said arms, a stem mounted on each arm, and a circular knife rotatably mounted on the lower end of each stem, said knives being disposed in the same horizontal plane and coöperating to sever the beet tops passing therebetween.

2. In a beet harvesting machine the combination of a wheeled frame, a pair of arms pivoted on said frame, spring means yieldingly supporting the free ends of said arms, a pair of stems provided with longitudinal slots through which said arms extend respectively, a second pair of arms pivotally connected to the first pair of arms respectively and having the lower ends of said stems engaged in their free ends respectively, springs encircling said stems and bearing against the first named arms at their upper ends and the second named arms at their lower ends, and circular knives rotatably mounted on the lower ends of said stems beneath the free ends of the second named arms respectively.

In testimony whereof, I affix my signature, in the presence of two witnesses.

ROBERT N. ADAMS.

Witnesses:
E. A. COWLEY,
H. J. PRICE.